United States Patent [19]
Suzuki et al.

[11] Patent Number: 5,805,554
[45] Date of Patent: Sep. 8, 1998

[54] VERTICAL DISC LOADING DEVICE HAVING A PIVOTAL HOLDER

[75] Inventors: Toshiaki Suzuki; Shin Kagami, both of Miyagi-ken, Japan

[73] Assignee: Samsung Electronics Co., Ltd., Kyungki-Do, Rep. of Korea

[21] Appl. No.: 730,020

[22] Filed: Oct. 11, 1996

[30] Foreign Application Priority Data

Oct. 31, 1995 [JP] Japan .................................. 7-282306

[51] Int. Cl.⁶ .................................................. G11B 17/04
[52] U.S. Cl. ...................... 369/77.1; 369/75.2; 360/99.06
[58] Field of Search ................... 369/77.1, 75.2, 369/36, 77.2, 191; 360/99.05, 99.06, 99.12

[56] References Cited

U.S. PATENT DOCUMENTS

| | | | |
|---|---|---|---|
| 4,561,084 | 12/1985 | Satake et al. | 369/75.2 |
| 4,744,072 | 5/1988 | Tamaki et al. | 369/75.2 |
| 5,187,700 | 2/1993 | Yoon | 369/75.2 |

FOREIGN PATENT DOCUMENTS

| | | |
|---|---|---|
| 05266561 | 10/1993 | Japan . |
| 6-111444 | 4/1994 | Japan . |
| 6-333311 | 12/1994 | Japan . |
| 07-93861 | 4/1995 | Japan . |
| 07130064 | 5/1995 | Japan . |

Primary Examiner—Stuart S. Levy
Assistant Examiner—Kevin M. Watkins
Attorney, Agent, or Firm—Sughrue, Mion, Zinn, Macpeak & Seas, PLLC

[57] ABSTRACT

A disc loading device including a disc tray having a disc settling part for loading a disc into a device body or for ejecting the disc from the device body. A holder is installed so that, when the disc tray is ejected in a vertical installation, the upper portion of the holder is open to retain the disc near the disc tray, and that when the disc tray is put in a loading position, the holder is closed to securely set the disc in the disc settling part.

7 Claims, 6 Drawing Sheets

VERTICAL DISC LOADING DEVICE HAVING A PIVOTAL HOLDER

BACKGROUND OF THE INVENTION

1. Field of the Invention

The present invention relates to a disc loading mechanism for a disc recording/reproduction device.

The present application is based on Japanese Application No. 282306/1995 which is incorporated herein by reference.

2. Description of the Related Art

Generally, a disc loading device such as a CD-ROM drive and the like for a disc shaped recording medium (referred to as a "disc" below) is installed such that a disc tray can be inserted into and removed from a main body of the device. The disc can be loaded into the device body and can be ejected from the device body by means of the disc tray. The disc tray is provided with a disc settling part for predetermining the disc position relative to a turn table which rotatably supports the disc. A disc is placed on the disc settling part so that loading/ejection can be carried out. That is, with the disc tray ejected from the device body, a disc is placed on the disc settling part. Then the disc is pulled into the device body on the tray to be loaded on the turntable. The turn table rises to be mated with the central hole of the disc. Then the disc is lifted to be clamped and driven.

As a result of the recent multimedia trend, the usefulness of the disc reproduction device as an external memory device of a PC (personal computer) has increased to the point where disc reproduction devices are becoming standard equipment on new PCs. The PC body or the disc device often is installed in a vertical posture. In such a case, the disc is also vertically disposed during use. However, the conventional disc loading device is not designed to be used in a vertical orientation, and therefore, the disc cannot reliably be placed on the disc settling part of the disc tray without a modification.

Devices for allowing vertical installation of a disc device are disclosed in Japanese Patent Application Laid-open No. Hei-6-111444 and Hei-6-333311. In both devices, the disc has to be inserted into a gap which is formed between a hook shaped disc retaining member and the bottom of the disc settling part. The gap is very narrow, and therefore, insertion is cumbersome. Further, it is not possible to retain the upper portion of the vertically disposed disc due to the nature of the structure. Therefore, the disc is not loaded reliably.

SUMMARY OF THE INVENTION

Therefore it is the object of the present invention to provide a disc loading device having a disc loading mechanism in which vertical installation is facilitated, the operational characteristics during the loading of the disc are improved, and in which the disc can be retained securely.

In achieving the above object, the disc loading device according to the present invention is characterized in that a holder is installed so that, when the disc tray is ejected in a vertical installation, the upper portion of the holder is open, and that when the disc tray is put to a loading position, the holder is closed to make it possible to securely set the disc onto the disc settling part. In the case where a disc loading mechanism having this holder is used, if the disc is inserted into the open holder during the loading of the disc, then the disc is securely placed on the disc settling part. Accordingly, the disc does not have to be inserted into a narrow gap between the securing member and the disc settling part. Further, the holder can be designed such that the whole face of one side of the disk can be retained, and therefore, the reliability of disc retention is improved. If this holder is designed in a detachable form, it can be detached from the disc loading device for use in a horizontal installation, and therefore, the holder does not hinder a horizontal installation. Further, the holder can be opened and closed manually or automatically, so that the holder automatically opens during the ejection of the disc tray, and automatically closes upon loading the disc tray.

In one preferred embodiment, the holder includes: a disc retaining body fit to the disc tray; two supporting shafts installed on the lower edge of the disc retaining body for supporting an engaging portion installed proximate the disc tray; a plurality of retaining protuberances projecting from the disc retaining body for adjusting the disc retaining position so as to set the disc to a disc settling part of the disc tray; and a cam for opening/closing the disc retaining body by contact with a cam member installed within the device body. The disc retaining body pivots around the supporting shaft, so that its upper portion can be opened. Thus, the disc retaining body retains one face of the disc in an inclined posture. Therefore, the disc can be retained in a sure manner. Further, in accordance with the insertion and ejection of the disc tray by the actuation of the cam, the disc retaining body is automatically opened/closed. Further, the supporting shaft is supported by being engaged with the engaging portion of the disc tray, and therefore, the disc retaining body can be detached easily from the disc tray.

In the ejected position of the disc tray, the holder can be sufficiently pivoted due to its own weight. However, in order to ensure a definite actuation, a pressing means may be installed for forcing the disc retaining face body in the opening direction. The pressing means may consist of a coil spring which is installed on the supporting shaft. However, in view of the detachability and ease of manufacturing, a flat spring can be molded integrally to the disc retaining face body, and projected toward the disc tray.

BRIEF DESCRIPTION OF THE DRAWINGS

A more complete appreciation of this invention, and advantages thereof, will be apparent as by reference to the following detailed description of embodiments thereof when considered in conjunction with the accompanying drawings, in which like reference symbols indicate the same or similar elements, wherein.

DETAILED DESCRIPTION OF THE PREFERRED EMBODIMENTS

Figure 1:
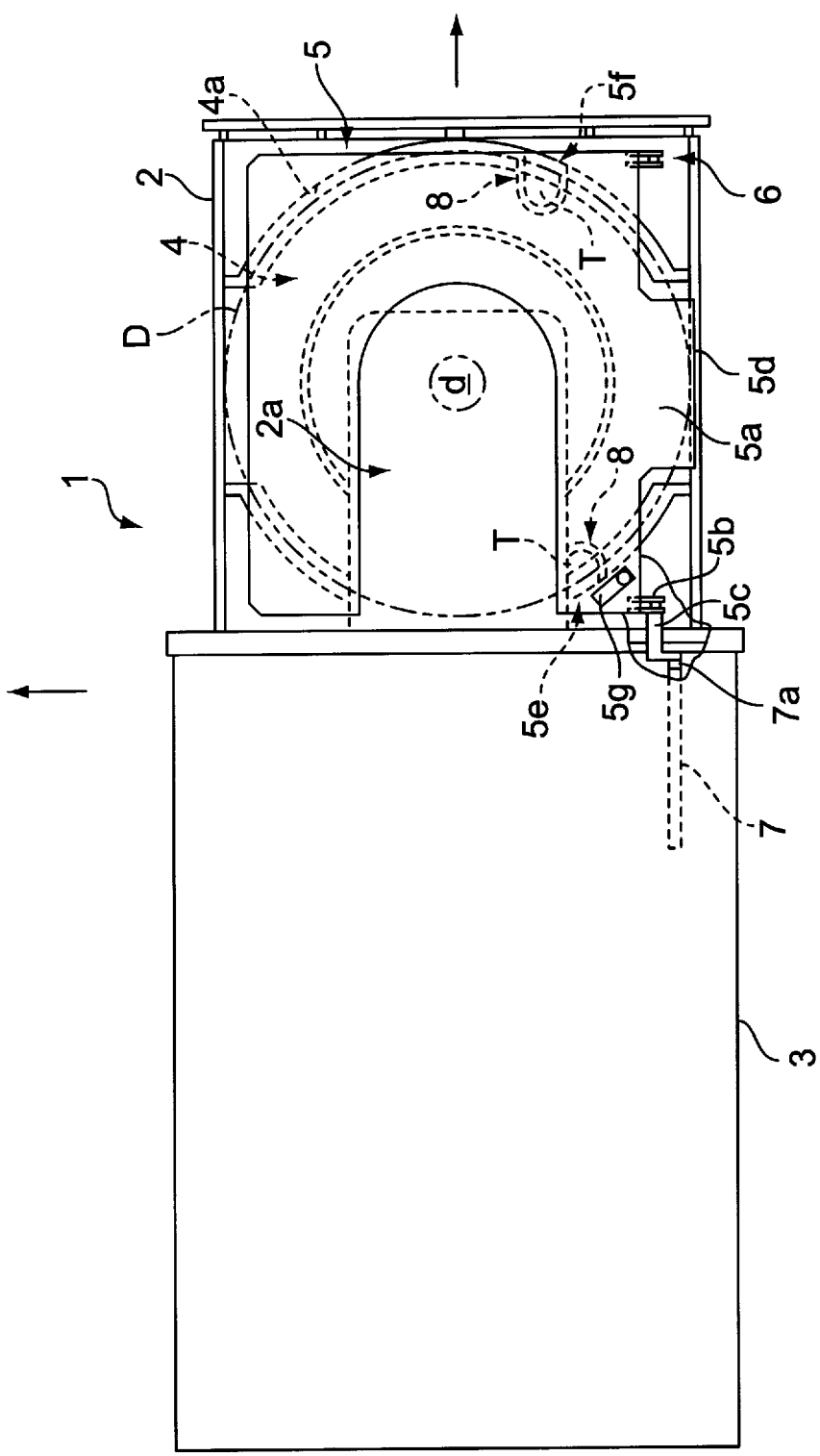
FIG. 1 is a partly sectional side view of the preferred embodiment in an ejected state of the disc in a vertical installation.
Figure 2A:
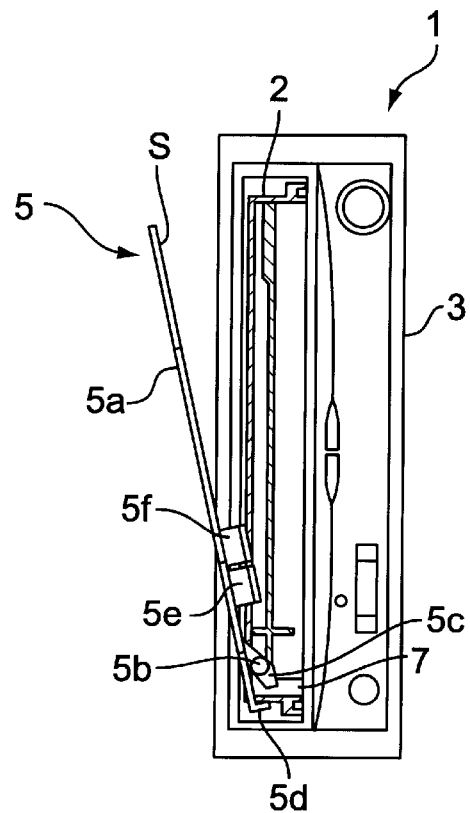
FIG. 2A is a partly sectional frontal view of the preferred embodiment in a vertical installation.
Figure 2B:
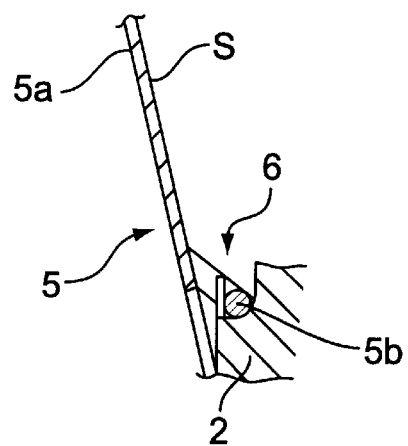
FIG. 2B is an enlarged illustration of the engaging portion of the disc tray.
Figure 3:
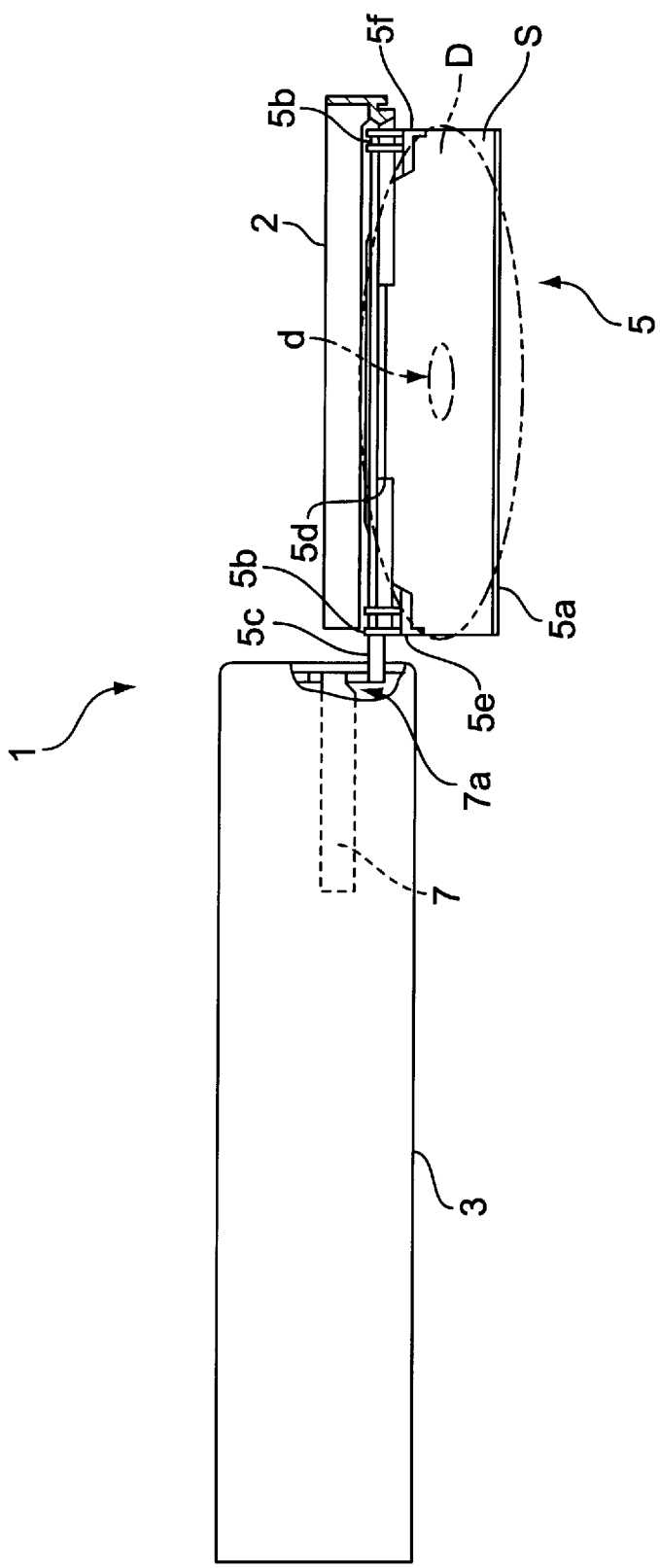
FIG. 3 is a partly sectional plan view of an ejected state of the preferred embodiment in a vertical installation.

As illustrated in FIGS. 1–3, disc loading device 1 of a CD-ROM drive has disc tray 2. An opening 2a on disc tray 2 permits access by a known type of driving section (not shown) which is installed within a device body 3, and which consists of a turn table and an optical pickup. That is, the driving section is capable of ascending and descending. Further, when the disc tray 2 is in an ejected position, the driving section is in a descended position, and therefore, it does not interfere with the movement of the disc tray 2. When the disc tray 2 is in a loading position, it ascends through the opening 2a, and receives a disc D on the turn table, when the disc D is placed in a recessed disc settling part 4. Then the driving section clamps the disc D with a clamp (not shown) and rotates the disc D for reproduction of the recorded information in a known manner.

The disc settling part 4 determines the position of the disc D relative to the turn table, and is formed approximately at the center of the disc tray 2. When the disc D is set to the disc settling part 4, the peripheral edges of the disc D contact side walls 4a of the disc settling part 4, and thus, the central hole d of the disc D is positioned proximate the turn table. In other words, the disc D is effectively standing on its edge so that its axis is perpendicular to the movement of the disc D as it is ejected from or loaded in the device body. The side walls 4a of the disc settling part 4 are sloped, such that the spatial area therebetween narrows as it approaches the bottom of the settling part 4.

Figure 4:
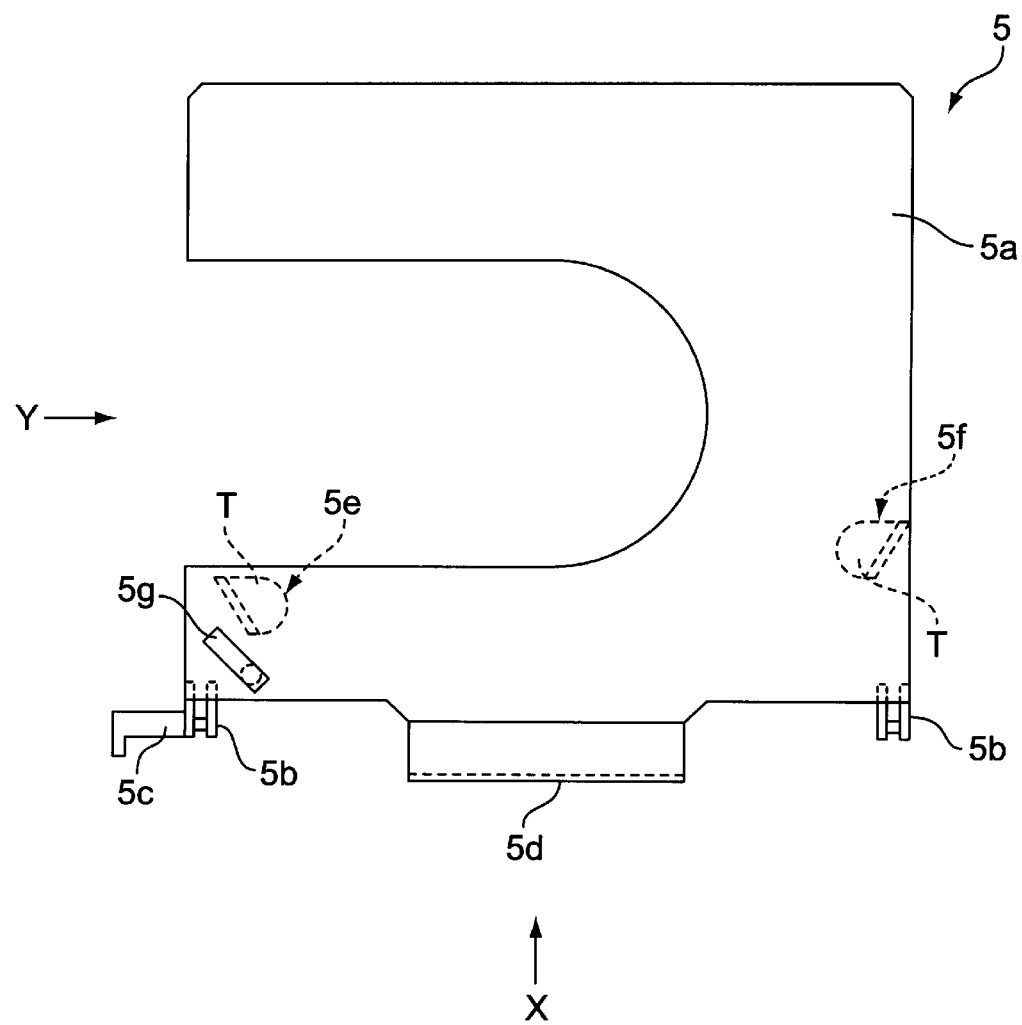
FIG. 4 is a side view of the holder of the preferred embodiment.
Figure 5:
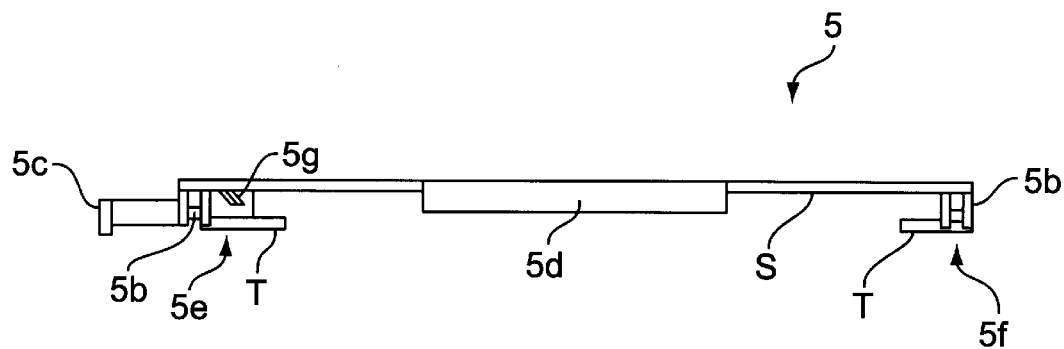
FIG. 5 is a side view of the holder observed in the direction of an arrow mark X of FIG. 4.
Figure 6:
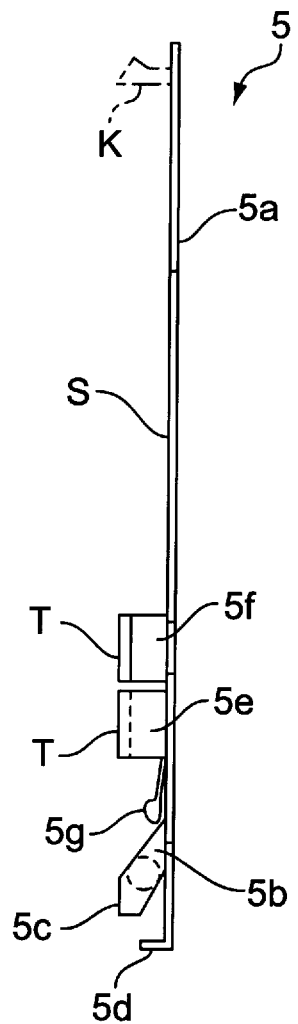
FIG. 6 is a side view of the holder observed in the direction of an arrow mark Y of FIG. 4.

A holder 5 of a preferred embodiment has a U shaped disc retaining body 5a, as shown in detail in FIGS. 4–6, which corresponds in shape with the disc tray 2. The disc retaining body 5a has two supporting shafts 5b formed on the lower edge thereof in a slightly projecting manner. The supporting shafts 5b are supported on the tray 2 in a detachable manner by being engaged with an engaging portion 6 (FIG. 2B) which is positioned in opposition to the disc tray 2. A cam 5c projects from one of the supporting shafts 5b and contacts with a cam member 7 which is installed within a device body 3. Consequently, when in an ejecting position, the holder 5 automatically opens, while when returning to a loading position, the holder 5 automatically closes. That is, curved surface 7a is formed at the end of the cam member 7, and in accordance with the movement of the disc tray 2, the cam 5c is forcibly moved along the curved surface 7a, with the result that the holder 5 pivots to the open position when the tray 2 is ejected.

Figure 7:
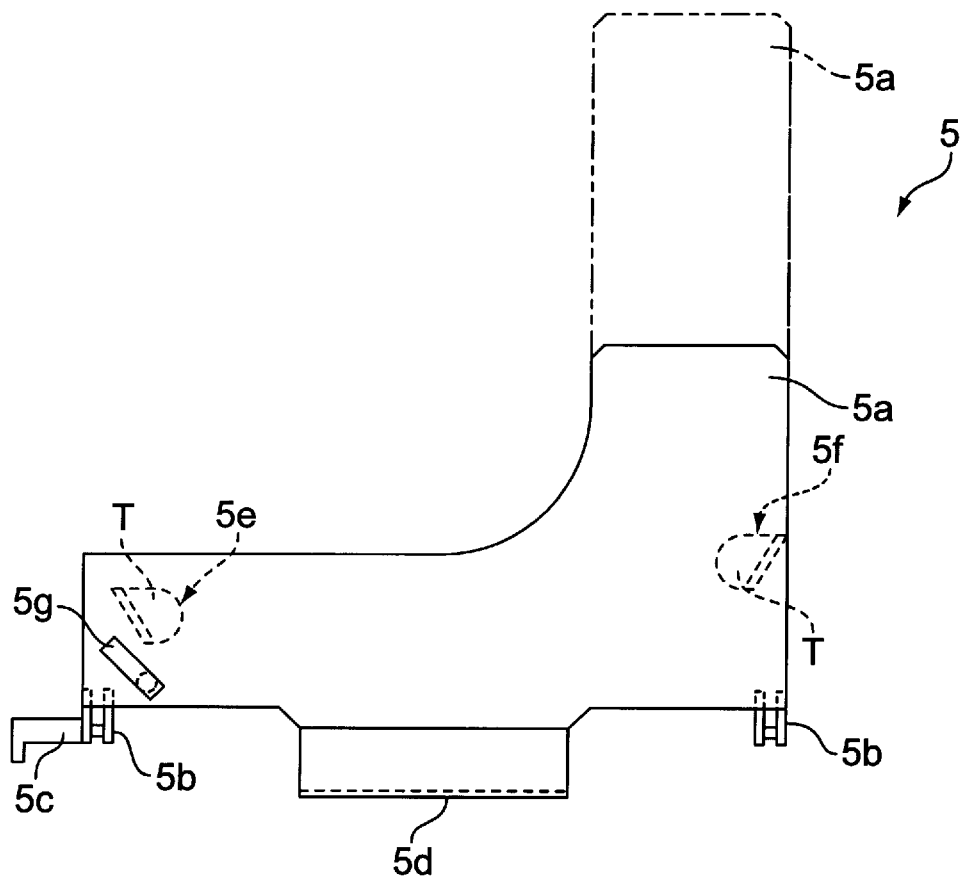
FIG. 7 is a side view showing another embodiment of the holder corresponding to FIG. 4.

Alternatively, a coupling piece K as shown by the dotted lines of FIG. 6 can be installed on the upper portion of the disc retaining body 5a, and a coupling portion (not shown) can be formed on the corresponding portion of the disc tray 2, for engagement with the coupling piece K. With this construction, manual opening/closing can be achieved reliably. A "click feeling" can be obtained ensuring that the holder 5 has been completely closed. Therefore, this manual method may be desirable. Further, as shown by the solid line in FIG. 7, the disc retaining body 5a can have a sufficient retaining effect if it extends only to the center of disc D. Also, disc retaining body 5a can have an L-shaped contour as shown by the dotted lines in FIG. 7.

The holder 5 may have a constitution such that both its upper and lower portions open, i.e. separated from the tray in an open position. However, as shown in the preferred embodiment, if at least the upper edge is open, then sufficient operational characteristics can be obtained. Further, the preferred embodiment requires only a few components and thus is simple. Another engaging portion 6 may be formed symmetrically relative to the disc tray 2, and the supporting shafts 5b and the cam 5c are disposed on the disc retaining bqdy 5a in the opposite direction to that illustrated in the drawings. In such a holder 5, an opposite contour can be obtained. Alternatively, if the supporting shafts 5b and the cam 5c are installed on the both faces of the disc retaining body 5a, then only a single holder 5 can be used.

Retaining protuberances 5d, 5e and 5f are disposed on holder 5 so that the retaining face portion S of the disc retaining body 5a evenly contacts with the peripheral edges of the disc D, and that the retaining position of the disc D can be adjusted to position the disc D on the disc settling part 4. If the disc D is inserted, the upper and lower positions of the disc D are adjusted by the retaining protuberance 5d relative to the disc settling part 4, and the frontal and rear positions of the disc D are adjusted by the retaining protuberances 5e and 5f relative to the disc settling part 4. The leading ends T of the retaining protuberances 5e and 5f are bent like a hook, and the leading ends T touch the disc D when the holder 5 is opened. Consequently, the disc D is taken out of the disc settling part 4, and retained by the holder 5. The gap between the leading ends T of the retaining protuberances 5e and 5f and the disc retaining face body 5a is larger than the depth of the disc settling part 4, and therefore, the portion corresponding to the disc settling part 4 is provided with a through hole 8 to allow the leading ends T to pass therethrough. The gap between the leading end T and the disc retaining face body 5a can be made large enough to prevent manufacturing difficulties.

In the preferred embodiment, the disc retaining body 5a of the holder 5 is integrally provided with a flat spring 5g as a pressing means for biasing the holder 5 toward the open position. Flat spring 5g is formed by cleaving a part of the disc retaining face body 5a toward the disc tray 2.

Now operation of the disc loading device 1 of the embodiment having the holder 5 will be described.

First, when loading the disc D, the disc loading device 1 is manipulated to place the disc tray 2 in an ejecting position. Then, due to the cam 5c and the flat spring 5g, the upper portion of the holder 5 is opened, i.e. pivoted away from the disc tray 2, as shown in FIG. 2A. Accordingly, the disc D can be easily inserted into the holder 5 from above so that the disc D is vertically positioned to stand on its edge. The position of the disc D which has been inserted into the holder 5 is adjusted by the three retaining protuberances 5d, 5e and 5f, and thus, the disc D is retained by the retaining face portion S of the disc retaining body 5a.

Then, if the disc loading device 1 is manipulated to place the disc tray 2 in the loading position, the cam 5c moves along the cam member 7 in accordance with the movement of the disc tray 2, until the cam 5c runs beyond the curved surface 7a of the cam member 7. Therefore, the holder 5 automatically pivots to a closed position before the disc tray 2 enters the device 1. In this closed state, the leading ends T of the retaining protuberances 5e and 5f enter through the through holes 8 beyond the disc settling part 4, with the result that the disc D is placed in the disc settling part 4 of the disc tray 2.

Meanwhile, in the loading position of the disc tray 2, the disc D which is placed in the disc settling part 4 is slightly raised by being supported by the turn table, and rotational driving for the disc D starts in a known manner. The relationship of the disc ascending amount to the turn table and the closed position of the holder is designed, so that the disc retaining body 5a of the holder 5 does not interfere the rotation of the disc D.

When ejecting the disc D, as the disc tray 2 is moved to the ejecting position, the cam 5c and the flat spring 5g cause to the disc tray 2 to be moved to the ejecting position, and the holder 5 is pivoted to an open position. During the opening of the holder 5, the leading ends T of the retaining protuberances 5e and 5f contact the disc D, and therefore, the disc D is taken out of the disc settling part 4 to be retained by the holder 5. Therefore, the disc D can be taken out of the holder 5 from above.

In the case where the disc loading device 1 is installed horizontally, if the supporting shaft 5b is pulled out from the engaging portion 6 so as to detach the holder 5, then the disc loading device 1 can be used in the conventional manner.

According to the present invention as described above, the disc is retained by means of the pivoting holder, and the holder further serves as a loading mechanism for placing the disc on the disc settling part. Therefore, even in a vertical installation, the operating characteristics of the disc loading device are significantly improved, because the disc inserting opening can be enlarged. Further, the holder can support the entire face of the disc, and therefore, the disc can be securely retained. Further, the holder can be manufactured by an injection molding process, and therefore, the number of required components is small. This reduces cost and improves assembly compared with the conventional devices.

What is claimed is:

1. A disc loading device including a disc tray having a disc settling part for loading a disc into a device body and for ejecting said disc from said device body wherein said disc is vertically aligned to stand on an edge so that the axis of said disc is perpendicular to the movement of said disc when loaded or elected from said device body, said loading device comprising:

a holder coupled to said disc tray so that, when said disc tray is ejected in a vertical installation, an upper portion of said holder is open allowing insertion and removal of said disc therefrom while preventing said disc from falling out of said disc tray, and when said disc tray is in a loading position, said holder is closed to securely set said disc in said disc settling part.

2. A disc loading device as claimed in claim 1, wherein a lower portion of said holder is pivotally coupled to a lower portion of said disc tray.

3. The disc loading device as claimed in claim 2, wherein said holder is detachably coupled to said disc loading device.

4. The disc loading device as claimed in any one of claims 2 and 3, further comprising:

means for placing said holder in an open position when said disc tray is in an ejected position, and for placing said holder in a closed position when said disc tray is put in a loading position.

5. The disc loading device as claimed in claim 4, wherein said holder comprises:

a disc retaining body;

two supporting shafts installed on the lower edge of said disc retaining body for engagement with an engaging portion installed on said disc tray;

a plurality of retaining protuberances projecting from said disc retaining body for adjusting the position of a disc set in said disc retaining body to set said disc tray to said disc settling part when said disc retaining body is placed in a closed position;

a cam disposed on said disc retaining body;

a cam member for opening/closing said disc retaining body by contacting said cam, said cam member being installed within said device body.

6. The disc loading device as claimed in claim 5, further comprising means for biasing said holder towards an open position.

7. The disc loading device as claimed in claim 6, wherein said means for biasing is a flat spring formed integrally with said disc retaining body and projecting toward said disc tray.

* * * * *